July 28, 1936. J. R. JOHNSON 2,049,394
SLIDEWAY FOR MACHINE TOOL ELEMENTS
Filed Nov. 10, 1934
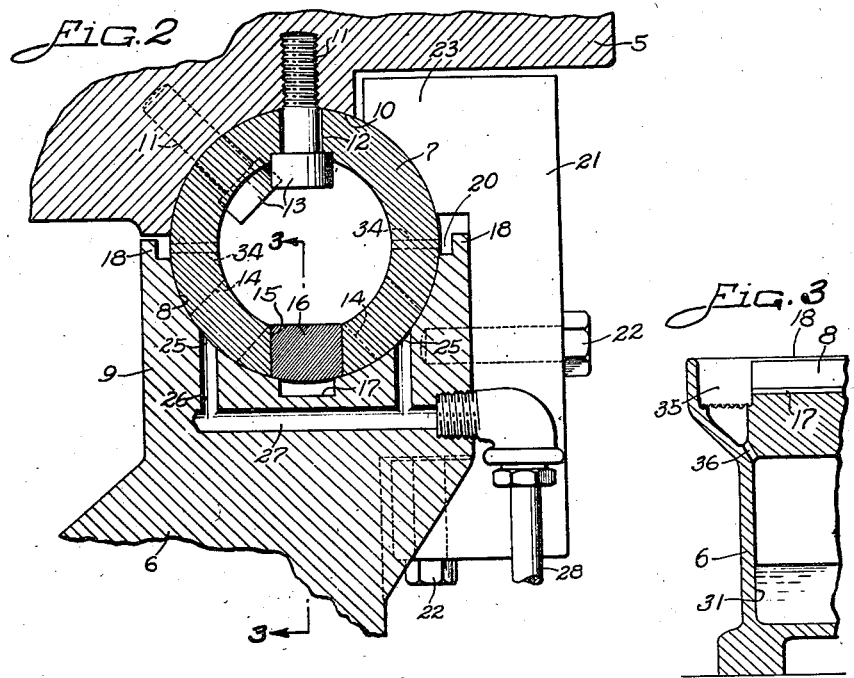
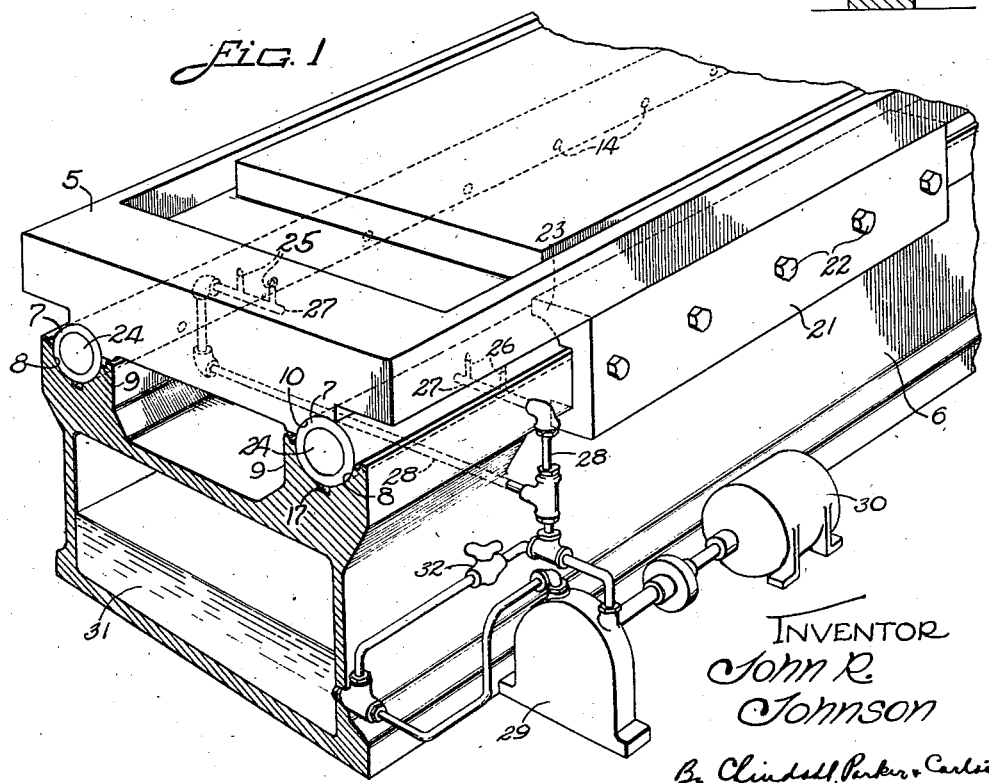
INVENTOR
John R. Johnson
By Chindell, Parker & Carlson
ATTORNEYS Patented July 28, 1936

2,049,394

UNITED STATES PATENT OFFICE 2,049,394

SLIDEWAY FOR MACHINE TOOL ELEMENTS

John R. Johnson, Rockford, Ill., assignor to The Ingersoll Milling Machine Company, Rockford, Ill., a corporation of Illinois Application November 10, 1934, Serial No. 752,436

6 Claims. (Cl. 308—5)

This invention relates to the construction and mounting of a reciprocable element such as the work table or tool carriage of a machine tool organization.

The primary object of the invention is to provide a novel slideway construction for the above use which is simpler and less expensive to manufacture than the slideways heretofore used and lends itself readily to automatic lubrication.

Other objects and advantages of the invention will become apparent from the following detailed description taken in connection with the accompanying drawing, in which Figure 1 is a fragmentary perspective view of a machine tool organization equipped with a slideway construction embodying the features of the present invention, the bed of the machine being shown in cross section.

Fig. 2 is a fragmentary cross sectional view through one of the slideways.

Fig. 3 is a fragmentary sectional view of the machine bed taken along the line 3—3 of Fig. 2.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown, the invention is utilized as a means for supporting a reciprocable element, such as a work table 5, for sliding movement along a bed 6. The slideway construction comprises generally two tubes 7 formed separate from and rigidly secured to opposite side edges of the table 5 along the underside thereof and seated in ways 8 of complemental shape defining upwardly opening grooves in flanges 9 upstanding from the bed 6 along opposite sides thereof.

The tube 7 is of integral construction and preferably is of cylindrical shape so that its external surface may be machined with a high degree of accuracy and the desired finish by an inexpensive metal removing operation such as grinding in a centerless grinder. The underside of the table is machined to form a seat 10 of concave contour for receiving a portion of the tube segment which projects above the way 8. The tube is fastened in this seat by cap screws 11 projecting through radial holes 12 in the upper part of the tube and threading into the table with their heads 13 seated in recesses countersunk in the internal surface of the tube. Access to the heads for the purpose of entering and tightening the screws may be had through holes 14 and 15 alined with the screw holes and having diameters larger than the screw heads. After attachment of the tube to the table, plugs 16 are driven into the holes 15 to close the latter.

The bed way 8, being of semi-cylindrical contour, may be machined accurately and with the desired finish through the use of formed tools such as milling cutters. In the same operation, an upwardly opening groove 17 is cut in the bottom of the way, and upstanding flanges 18 are formed along opposite sides of the way. These flanges are spaced from opposite sides of the tube seated in the way and cooperate therewith to define troughs for receiving lubricating fluid as will appear later.

As a means for holding the tubes in place in the ways 8, elongated clamps 21 of generally channel shape are secured as by bolts 22 to the outer edges of the bed flanges 9 and have inturned flanges 23 overlying the tubes and machined to fit against the latter and apply thereto the clamping pressure necessary to hold the tubes in the ways. The clamps are of such lengths that a substantial length thereof will engage the associated tube throughout the range of movement of the table.

The tubes 7, when constructed and mounted in the manner above described and with their ends closed as by plugs 24, are intended to be used as reservoirs for lubricating fluid which is distributed to the coacting way surfaces as an incident to movement of the table. In the present instance, the lubricating fluid is supplied to the tube periodically through the holes 14 which, in a certain position of the table, register with ports 25 at the upper end of passageways 26 leading from a passageway 27, which passageway may be formed in the bed flanges 9 by simple drilling operations. The pasageways 27 are connected to the outlet pipe 28 of a pump 29. The latter, when driven from a suitable source of motive power such as an electric motor 30, withdraws oil from a sump 31 in the bed and delivers the same under pressure to the passageways 27. The rate of delivery may be controlled by varying the degree of opening of a by-pass valve 32 leading from the pipe 28 to the sump.

In the present instance, only one set of ports 25 is employed for each guideway, these being located near the longitudinal center of the guideway so as to be covered by the tube 7 in all positions of the table 5. It will be observed that when the table reaches a position in which the ports 25 register with the openings 14, communication will be established between the interior of the tubes 7 and the pump, the tubes being quickly filled at least to the level of outlet passages 34 extending through the tube walls and preferably terminating in the troughs 20. If desired, additional ports 25 communicating with the pump outlet may be employed so that the tubes will be filled in a plurality of different positions of the table, or additional holes 14 spaced along the tubes 7 may be employed for the same purpose.

The fluid delivered to the oil reservoirs is distributed along the way surfaces as the table moves back and forth. The flow is through the holes 14 after they have passed out of register with the ports 25 and through the passages 34 which are of relatively small diameters so that the troughs 20 will not overflow while the reservoirs are being filled. With this arrangement, oil will be distributed effectually to all of the engaging surfaces of the tubes and the ways 8.

At their ends, the troughs 20 empty into a receptacle 35 extending transversely of the bed 6 and communicating with the sump 31 through an outlet passage 36. Lubricant from the troughs 20 may also run down around the ends of the tubes 7 and drain into the receptacle 36 along the grooves 17 which serve to collect any sediment or foreign material coming onto the way surfaces.

I claim as my invention:

1. In a machine tool organization, the combination of an element such as a work carriage, an integral walled cylindrical hollow tube having a segment seated in said element on the underside thereof and rigidly secured to the element, a bed having an upwardly opening guideway of semi-circular section providing a seat for the lower segmental portion of said tube and defining a trough along one side of the tube, said tube being closed at opposite ends and having radial holes establishing communication between said trough and the interior of the tube, means providing a source of lubricating fluid under pressure including a passageway terminating in a port at the surface of said guideway opposite said tube, said tube having a hole therein adapted to register with said port in a certain position of said element, and means for collecting the lubricating fluid flowing along said trough.

2. In a machine tool organization, the combination of an element such as a work carriage, an integral walled cylindrical hollow tube seated in said element on the underside thereof and rigidly secured to the element, a bed having an upwardly opening guideway of semi-circular section providing a seat for the lower segmental portion of said tube, said tube being substantially closed at opposite ends, and means providing a source of lubricating fluid under pressure including a passageway terminating in a port at the surface of said guideway opposite said tube, said tube having a hole therein adapted to register with said port in a certain position of said tube.

3. In a machine tool organization, the combination of an element such as a work carriage, an integral walled cylindrical hollow tube having a segment seated in said element on the underside thereof and rigidly secured to the element, a bed having an upwardly opening curved guideway providing a seat for the lower segmental portion of said tube, said tube providing a reservoir for carrying lubricating fluid and having a peripheral hole therein for distributing fluid by gravity to the engaging surfaces of said tube and guideway in the movement of said element along the latter, means providing a source of lubricating fluid under pressure, and means operating in at least one position in the travel of said element to establish communication between said fluid source and the interior of said tube whereby to supply fluid to the latter for distribution to said guideway.

4. Mechanism for slidably supporting a machine tool element such as a work table comprising, in combination, an elongated hollow cylindrical tube extending along the underside of said element and rigidly fastened thereto, a bed having an upwardly opening groove corresponding in shape to the surface curvature of said tube and providing a slideway engaging a segmental portion thereof, clamping means anchored on said bed and overlying a segment of the peripheral surface of said tube, said clamping means engaging said surface and acting to maintain the tube seated in said groove and said tube constituting an oil retaining reservoir and having apertures therein from which lubricating fluid may gravitate onto the engaging surfaces of said slideway and tube.

5. Mechanism for slidably supporting a machine tool member such as a work table comprising, in combination, a supporting member, an elongated guide element having a cylindrical external surface and extending along one side of and rigidly fastened to one of said members, a groove on an opposed portion of the other member complemental in shape to the curvature of said surface and providing a slideway engaging a segmental portion of the surface, and clamping means anchored on said last mentioned member and overlying a segment of said surface on the side of said element opposite said groove, said clamping means directly engaging said surface and acting to maintain said guide element seated in said groove during the reciprocation of said machine tool member.

6. Mechanism for slidably supporting a machine tool member such as a work table comprising, in combination, a supporting member, an elongated structurally separate cylindrical tube extending along one side of and rigidly fastened to one of said members, a groove on the other member complemental in shape to the surface curvature of said tube and providing a slideway engaging a segmental portion of the surface, said tube constituting a reservoir for lubricating fluid and having a peripheral opening therein through which fluid is directed to the engaging surfaces of said tube and slideway, and means providing a source of lubricating fluid under pressure and automatically maintaining a supply of said fluid in said tube for distribution to said surfaces.

JOHN R. JOHNSON.